(12) United States Patent
McGuire et al.

(10) Patent No.: US 8,144,710 B2
(45) Date of Patent: Mar. 27, 2012

(54) MPLS TRANSPORT NETWORK SCHEME

(75) Inventors: Alan McGuire, Felixstowe (GB); Neil Harrison, Totnes (GB)

(73) Assignee: British Telecommunications public limited company, London (GB)

( * ) Notice: Subject to any disclaimer, the term of this patent is extended or adjusted under 35 U.S.C. 154(b) by 223 days.

(21) Appl. No.: 12/531,156

(22) PCT Filed: Mar. 5, 2008

(86) PCT No.: PCT/GB2008/000752
§ 371 (c)(1),
(2), (4) Date: Sep. 14, 2009

(87) PCT Pub. No.: WO2008/110751
PCT Pub. Date: Sep. 18, 2008

(65) Prior Publication Data
US 2010/0040061 A1 Feb. 18, 2010

(30) Foreign Application Priority Data
Mar. 14, 2007 (EP) ...................................... 07251059

(51) Int. Cl.
*H04L 12/28* (2006.01)
(52) U.S. Cl. ........................... 370/392; 370/466; 370/401
(58) Field of Classification Search ......................... None
See application file for complete search history.

(56) References Cited

U.S. PATENT DOCUMENTS

| | | | |
|---|---|---|---|
| 6,778,494 B1 * | 8/2004 | Mauger | 370/230 |
| 7,082,140 B1 | 7/2006 | Hass | |
| 7,433,963 B2 * | 10/2008 | Anschutz | 709/236 |
| 2008/0137657 A1 * | 6/2008 | Wood | 370/392 |
| 2009/0010256 A1 * | 1/2009 | Boodaghians | 370/389 |

FOREIGN PATENT DOCUMENTS

| | | |
|---|---|---|
| EP | 1 134 938 | 9/2001 |
| EP | 1 134 938 A1 | 9/2001 |

OTHER PUBLICATIONS

Bryant Editor Cisco Systems S: "Application of PWE3 to MPLS Transport Networks," IETF, standard-working draft, ETF, CH, Oct. 13, 2006, XP 015047504, accessed from the Internet at http://tools.ietf.org/id/draft-bryant-pwe3-mpls-transport-00.txt.
Rosen et al., "Multiprotocol Label Switching Architecture," accessed from the Internet at www.ietf.org/rfc/rfc3031.txt.
Rosen et al., "MPLS Stack Encoding," RFC 3032, accessed from the Internet at http://www.faqs.org/ftp/rfc/pdf/rfc3032.txt.pdf.
Bryant Editor Cisco Systems S:, "Application of PWE3 to MPLS Transport Networks", IETF Standard-Working-Draft, Internet Engineering Task Force, IETF, CH, Oct. 13, 2006, XP015047504.
International Search Resort for PCT/GB2008/000752, mailed Jun. 20, 2008.

* cited by examiner

*Primary Examiner* — Duc C Ho
(74) *Attorney, Agent, or Firm* — Nixon & Vanderhye P.C.

(57) ABSTRACT

A method of partitioning the header stack of a data packet, the header stack conforming to a label switching protocol, the method comprising: receiving the packet at an edge mode of a routing domain in the communication system; and processing the label header stack at the edge node to add a new stack entry having a label field comprising a value which delimits the header stack entries between a stack domain configurable by the node belonging to a first routing domain of the label switching protocol and at least one other stack domain configurable by a node belonging to another routing domain of the communications system.

24 Claims, 7 Drawing Sheets

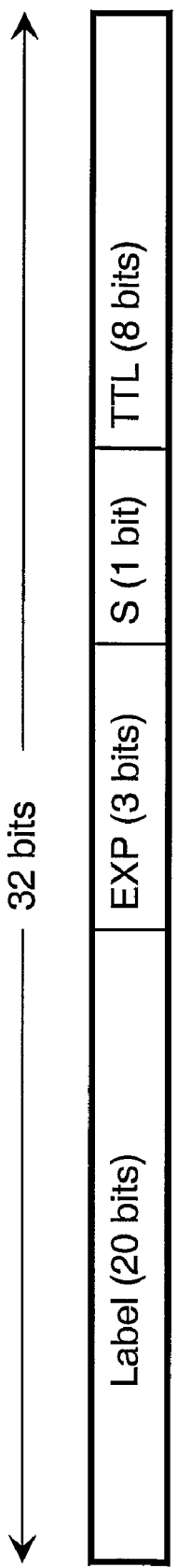

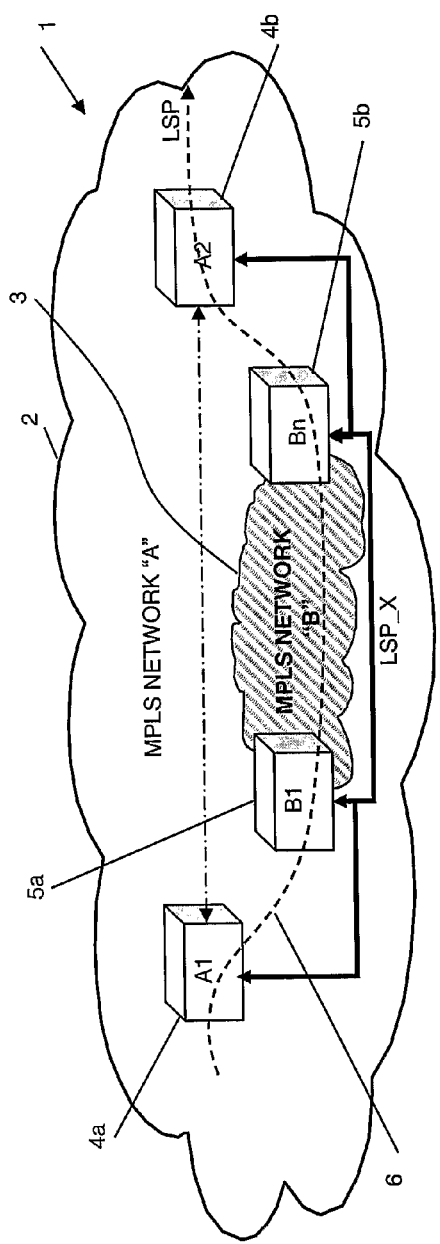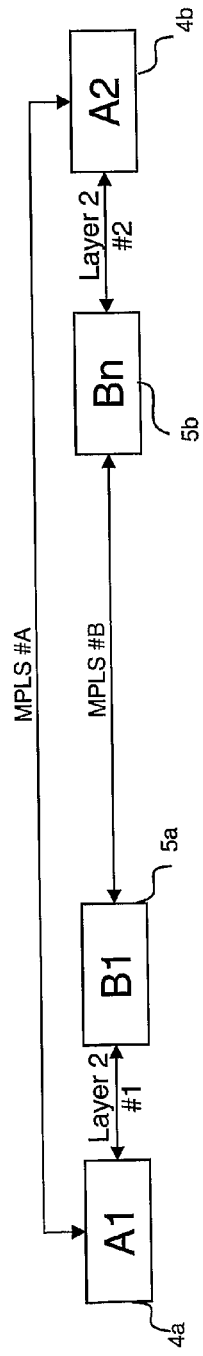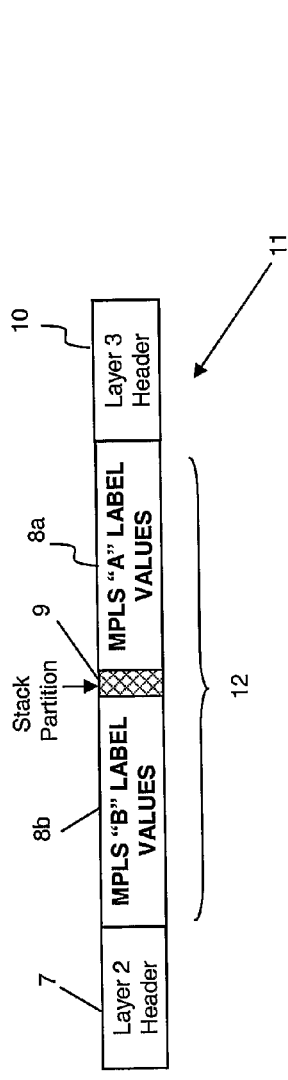
FIGURE 4A
FIGURE 4B
FIGURE 4C

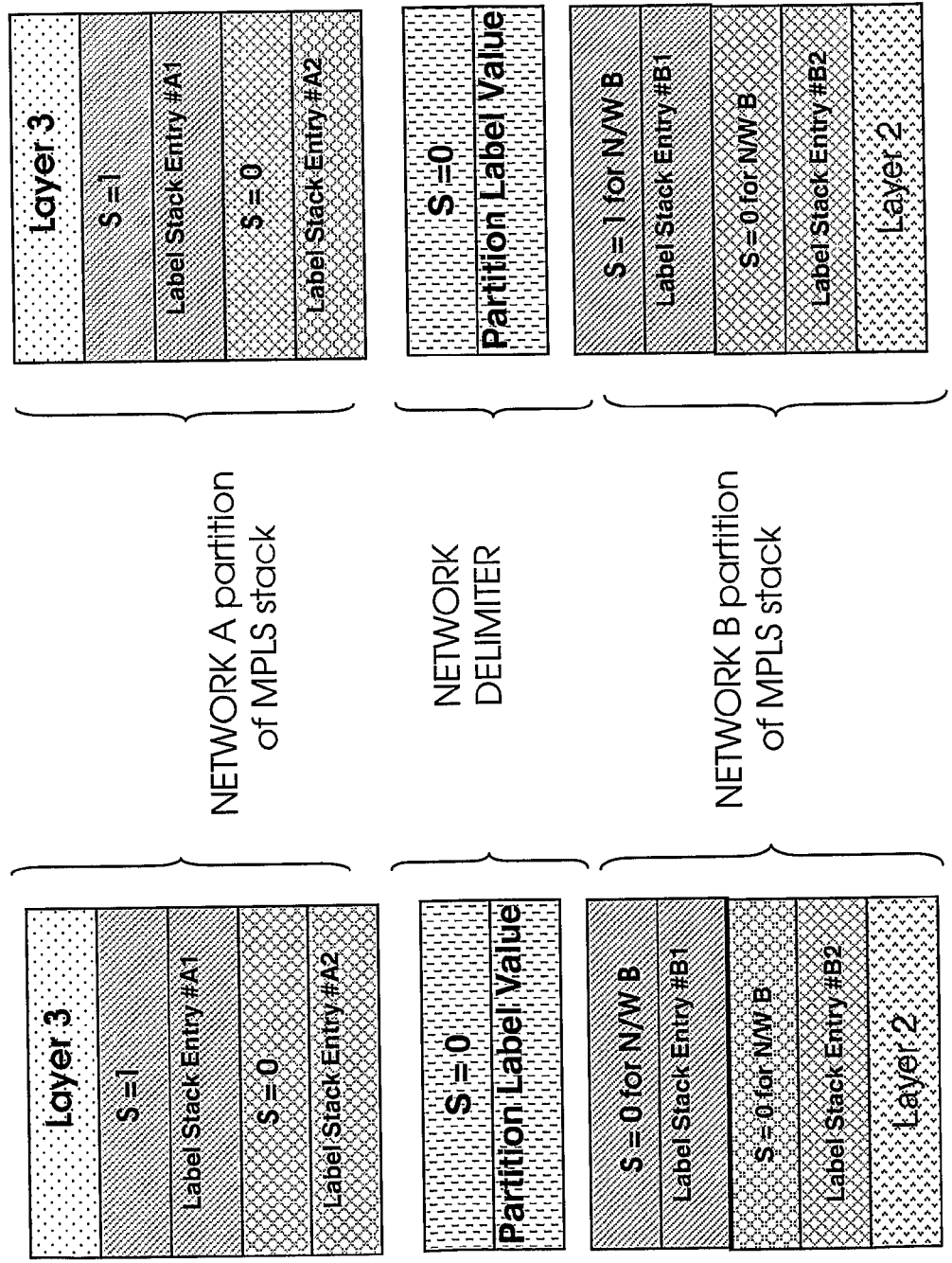

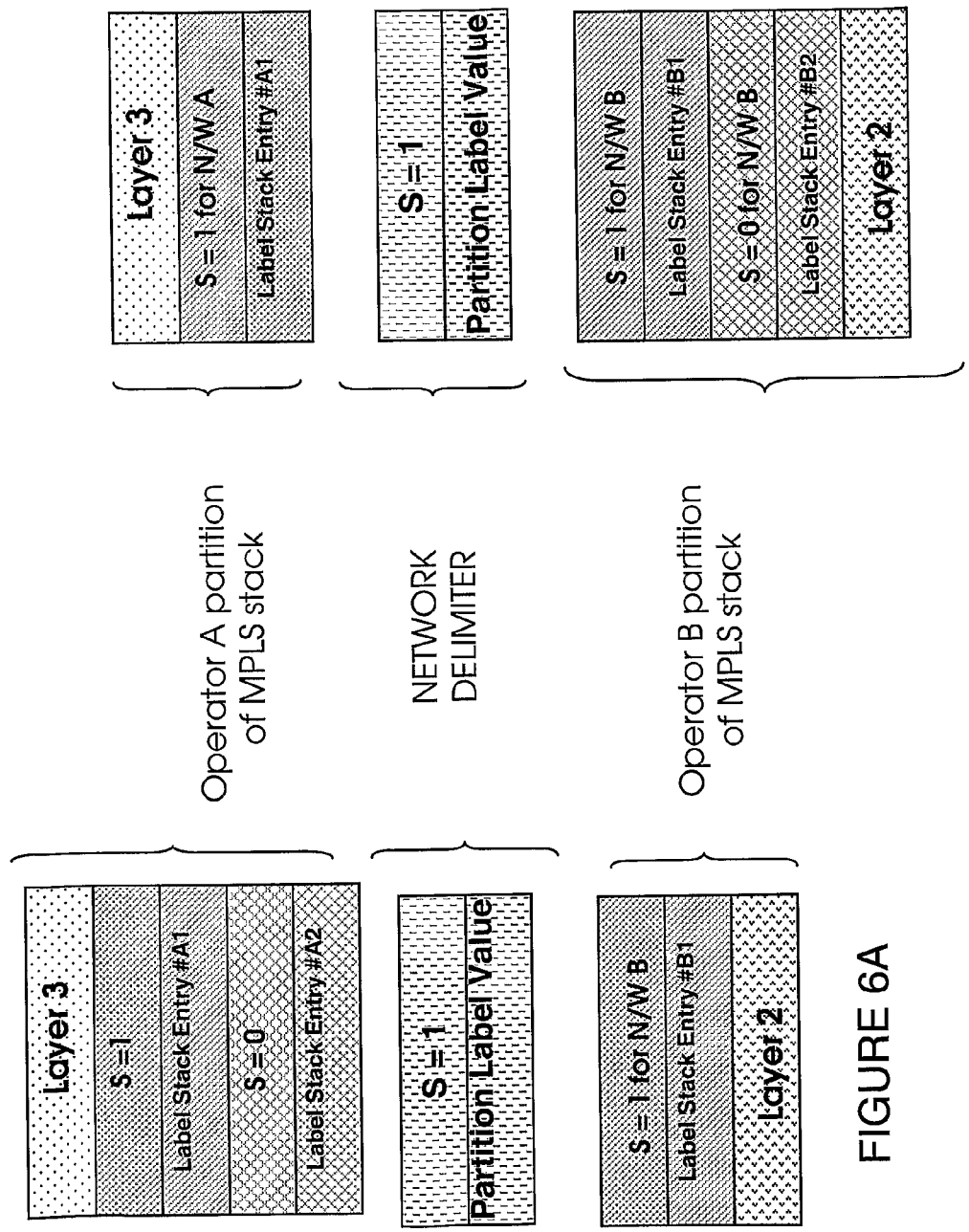

MPLS TRANSPORT NETWORK SCHEME

This application is the U.S. national phase of International Application No. PCT/GB2008/000752 filed 5 Mar. 2008, which designated the U.S. and claims priority to European Application No. 07251059.7, filed 14 Mar. 2007, the entire contents of each of which are hereby incorporated by reference.

The present invention relates to a method of partitioning a multi-protocol label switched (MPLS) header stack into different domains and in particular but not exclusively to a method of sending traffic conforming to one instance of a MPLS transport network protocol over another instance of a MPLS transport network protocol (known in the art as MPLS over MPLS).

MPLS was originally conceived as a method to improve the packet forwarding performance of Internet Protocol (IP) routers. However, it has subsequently been extended to carry other layer network technologies (like Asynchronous Transfer Mode (ATM), Frame Relay (FR), Plesiochronous Digital Hierarchy (PDH), etc) by the use of Pseudowire (PW) encapsulation techniques. The architecture of the MPLS standard is set out in RFC 3031 entitled "Multiprotocol Label Switching Architecture" submitted by E. Rosen et al in January 2001 to the Internet Engineering Task Force (IETF), the contents of which are hereby incorporated by reference. Electronic copies of this document are available for download from the URL: www.ietf.org/rfc/rfc3031.txt.

As is well known in the art, MPLS essentially enables faster routing decisions by preconfiguring "tags" which determine a path between one router and the next. The "tags" are essentially labels carried in short packet header fields which are extracted by switching/forwarding network nodes (known as label switched routers (LSRs)). LSRs are preconfigured to associate certain labels with particular outgoing port(s) and hence traffic containing that label can be routed without a more detailed inspection of the packet header. This avoids the need for hop-by-hop routing decisions to be made on the IP layer network address, instead traffic is sent along a path predetermined by a particular set of labels.

MPLS label stacking is already known in the art as a means of implementing MPLS tunnelling. To implement MPLS tunnelling, an outer transport label is used to establish a bulk transport Label Switched Path (LSP) (which functions as a tunnel), often between the provider edge devices of a provider's network, and within each bulk LSP inner transport labels are used to identify each traffic flow. Each packet can carry many labelled headers organized as a last-in-first-out stack. In normal forwarding across a MPLS network a LSR processes only the top (i.e. outermost) label. At any LSR, a labelled header can be added to the stack (by the LSR performing a "push" operation) or removed from the stack (by the LSR performing a "pop" operation). The label stacking allows the aggregation of LSPs into a single LSP for a portion of the route, which creates a "tunnel".

FIG. 1A shows a MPLS header. The MPLS header is 32 bits in length and comprises several functional fields. A MPLS stack comprises a plurality of MPLS headers and the position of the MPLS label stack in a frame (or equivalently in a packet) is shown in FIG. 1B.

As shown in FIG. 1A, a conventional MPLS 32 bit header comprises a 20 bit label field, a 3 bit EXP (experimental) field, a 1 bit S (stack) field and an 8 bit TTL field. Here the TTL field indicates the time to live of the MPLS packet. The S field is the bottom of stack field which indicates where the MPLS header is in a MPLS stack, S=1 indicates the MPLS header is at the bottom (i.e. innermost position which is closest to the payload) position in a MPLS stack, S=0 if not. FIG. 1B shows the how the MPLS label stack entries are positioned above the layer 2 (for example, data link) layer headers but below the network or layer 3 (for example, IP) headers. Other headers may be added, for example, there could also be a PW Control Word header here if the payload data is not IP.

FIG. 1C shows more clearly for a MPLS stack how the top of the label stack is received first by an LSR after the layer 2 (for example, a data link layer) header and the bottom of the label stack appears last and closest to the layer 3 (for example, a network layer) header. This bottom header has the S bit set to 1. All other headers will have the S bit set to 0.

FIG. 2 shows an expanded view of a MPLS Stack comprising three MPLS headers. The top section of FIG. 2 shows how the three tiers of MPLS labelled headers are stacked within a packet header. The bottom section of FIG. 2 shows how the layer 2 header is followed by two MPLS headers with S=0 and a third MPLS header which appears at the bottom of the MPLS stack has S=1.

The theoretical number of MPLS label values which could be provided by the 20 bit label value field of the MPLS header is $2^{20}$ however, in practice, some label values are reserved and have special significance. For further information, see the Request for Comment RFC 3032 entitled "MPLS Label Stack Encoding" submitted to the Internet Engineering Task Force standards body (the "IETF") by E. Rosen et al and dated January 2001 which indicates that values 0 to 15 are reserved. The contents of this document are hereby incorporated into this specification by reference.

When a labelled packet is received by an LSR, the label value at the top of the label stack, i.e., closest to the layer 2 header, is first processed to look up forwarding information. This allows the receiving LSR to learn the port to which the packet can be forwarded and/or any operation(s) to be performed on the MPLS stack before forwarding. Examples of operations a LSR performs on a MPLS stack include replacing the top label stack entry with another value and/or popping an entry off the label stack and/or replacing the top label stack entry and/or pushing one or more additional entries onto the label stack. Other operations a LSR can perform include learning the outgoing data link encapsulation and any other information needed to properly forward the packet.

Depending on the value assigned to the MPLS label field and other fields in the MPLS header stack, the label field can be interpreted in several ways by a receiving LSR. The label field can function, for example, as a forwarding label, as a source label, or as a functional label to indicate an operation that the LSR must perform.

When used as a forwarding label the label value field of the MPLS header functions as a proxy identifier for the "address" of the LSP destination end-point. In the case where this MPLS header is at the top of a stack of LSP MPLS headers, S=0, if it is however, the sole MPLS header in the stack, then S=1. It is used to forward the MPLS traffic unit in the data-plane towards the destination on a hop-by-hop basis (except when PHP (penultimate-hop-popping) is used, in which case the forwarding header is removed completely on the last hop).

When used as a source label, the 20 bit label value field functions as a proxy identifier for the "address" of the LSP source end-point. This functional use of a labelled header means it will invariably be the last entry in a stack of MPLS headers and so the S bit will be set to 1.

When used as a functional label, the label value field identifies a specific action that needs to be taken when received at an LSR. As is known in the art, the reserved values for the label field of the MPLS header specify specific functions which an LSR is to perform on a received packet. For example, label 14 indicates a router OAM alert to pass the contents of the traffic unit to the control/management plane for further action. In such a labelled header the S bit will usually be set to 1 (but this may not always be the case with other functional uses).

A network architecture has been proposed for transporting a client) MPLS network over a server MPLS network by S. Bryant and is described in the Internet Draft entitled "Application of PWE3 to MPLS Transport Networks" submitted to the Internet Engineering Task Force on 13 Oct. 2006. A copy of this paper can be obtained from https://tools.ietf.org/id/draft-bryant-pwe3-mpls-transport-00.txt. FIG. 3A shows how S. Bryant et al have proposed a prior art solution to the problem of how to transport traffic from one operator's MPLS network (MPLS network "A") over another operator's MPLS network (MPLS network "B"). This prior art solution comprises a form of MPLS tunnelling. In FIG. 3A, a MPLS Label Switched Path (LSP) is established between Customer Edge nodes CE1 and CE2 which are within the domain of MPLS network "A". This LSP is carried over Ethernet. Ethernet is provisioned between CE1 and PE2, and an Ethernet pseudowire (PW) is provisioned between the Provider Edge equipment PE1 and PE2 to carry the Ethernet traffic from PE1 to PE2, Ethernet is also provisioned between PE2 and CE2. The Ethernet PW is carried over an IP or MPLS PSN. If MPLS is used the tunnel LSP is not configured with PHP.

The Ethernet transport PW shown in FIG. 3A can support multiple service LSP instances, for example a service LSP and a trunk LSP (which can carry aggregations of the service instances). The identification of each service instance within its aggregate is based on labels and service instances can be aggregated onto trunks by pushing labels and de-aggregated by popping labels (here the terms "pushing" and "popping" are used in the sense known in the art).

The prior art scheme proposed by S. Bryant separates the two MPLS header stacks by inserting an Ethernet header between the two stacks, as is shown schematically in FIG. 3B. Thus it is known in the prior art to use an inserted Ethernet layer network header to functionally separate two MPLS layer networks, i.e., to provide a network stack in which MPLS is layered over Ethernet which is in turn layered over MPLS: This prior art solution separates the two MPLS stacks and allows full functional decoupling of the two MPLS networks, e.g. the data/control/management planes of operator A are isolated from the data/control/management planes of operator B. However, it has certain limitations such as, for example, the fact that both networks must support the same buffer technology (i.e., both the server and client MPLS networks must support the same inserted Ethernet technology) and this must go end-end between the CE devices. This is because the PE devices are expecting an Ethernet presentation, which will become a client PW carried over the middle server PSN network. Another limitation is that inserting a layer 2 technology such as Ethernet into the MPLS stack to enforce a partition results in additional operational overhead, e.g. the management of a degenerate (i.e. i-hop) Ethernet layer network.

Accordingly, in the prior art, it is known for the Ethernet layer to extend end-end along the LSP between the customer edge (CE1 and CE2) devices.

It is also known in the art to support a label switched path across a non-MPLS network. In European Patent Application EP 1 134 938 in the name of Nortel Networks Corporation, Barry Hass describes a system, device and method for supporting a label switched path across a non-MPLS network. This system requires the label stack information of a packet sent over the LSP to be preserved by establishing an IP tunnel across the non-MPLS domain of the LSP which connects a first MPLS domain and a second MPLS domain of the LSP. The packet and label stack information are encapsulated and sent over the IP tunnel and a MPLS identifier is included in the header of the encapsulated packet so that the packet and label stack information may be identified at the second MPLS domain.

The MPLS transport network scheme of the invention seeks to obviate the limitations of known methods for using MPLS as a transport network, which require a consistent technology to be implemented along a LSP between two client MPLS devices over the transport provider's MPLS network. The invention seeks to provide a method of using MPLS as a transport network comprising interconnecting two Label Switched Routers (LSRs) located in a first (client) MPLS network using the infrastructure of a second (server) MPLS network, i.e., to implement a MPLS-over-MPLS client/server relationship which does not need to insert a different and fixed-type of technology in the MPLS header stack to create a functional separation of the two MPLS networks.

SUMMARY STATEMENTS OF INVENTION

A first aspect of the invention comprises a method of partitioning a header stack of a data packet, said header stack conforming to a label switching protocol and comprising a plurality of headers each of which comprises a label field to which a label value is assignable to enable a label switching node to route said packet in a network routing domain of said label switching protocol in a communications system comprising a plurality of networks, the method comprising: receiving said packet at an edge node of a routing domain in said communications system; and processing the label header stack at the edge node to add a new stack entry having a label field comprising a value which delimits the header stack entries between a stack domain configurable by said node belonging to a first routing domain of said label switching protocol and at least one other stack domain configurable by a node belonging to another routing domain of said communications system.

Thus a label stack can be delimited by marking an operational boundary so that only a portion of the stack up to a boundary marker (or within a pair of boundary markers) can be operated by one or more nodes at the edge or within an operational domain of the communications system. Examples of operational domains include routing domains.

In one embodiment, the method enables a multi-protocol label switching (MPLS) transport network scheme to be implemented according to the invention.

In one embodiment, said step of receiving said packet and processing the header to add a stack entry having a delimiting value is iterated more than once to partition the header stack into additional stack domains.

In one embodiment, each additional stack domain is partitioned by a stack entry having a different delimiting value.

In one embodiment, each additional stack domain is partitioned by a stack entry having the same delimiting value.

In one embodiment, the value assigned to the label field of a header which delimits the header stack entries comprises a reserved value according to the label switching protocol.

In one embodiment, said stack entry having a delimiting value is indicative that the header stack is to be partitioned at that point such that other nodes in the same routing domain as said edge node are only capable of operating on one more additional headers added to the header stack that were applied by the same routing domain that added the stack delimiting value.

In one embodiment, said label switching protocol comprises a multi-protocol label switching (MPLS) protocol.

Another aspect of the invention seeks to provide a method of partitioning a multi-protocol label switching (MPLS) header stack into a plurality of stack control domains, the method comprising:

receiving a MPLS labelled packet at a MPLS node;

said MPLS node adding a network delimiting MPLS header to the MPLS label stack of the packet, wherein the label field value of said MPLS header is assigned a predetermined value indicative that the MPLS stack of MPLS headers is to be partitioned after that point such that the network of said MPLS nodes is only capable of operating on one more additional MPLS headers added to the packet after the network delimiting MPLS header and before any further network delimiting MPLS header.

Another aspect of the invention seeks to provide a method of routing multi-protocol label switching (MPLS) traffic in a communications system comprising a plurality of MPLS networks, said plurality of MPLS networks comprising a hierarchy of MPLS networks, each MPLS network in said hierarchy comprising a plurality of MPLS nodes capable of interfacing with a MPLS node in a different level of said hierarchy, such that at each layer in the MPLS network hierarchy, the client MPLS network is able to route traffic from a first MPLS node to another MPLS node in the client MPLS network using another MPLS network in said hierarchy as a server network, said method comprising:

an ingress MPLS edge node of said server network receiving MPLS traffic from said first MPLS node of said client MPLS network, said MPLS traffic comprising a plurality of packets; and said ingress MPLS edge node of the server network processing each received packet to partition the MPLS stack of each of said plurality of packets between the stack entries which are operable on by nodes in said client network and stack entries which are operable on by nodes in said server network.

In this way, one MPLS network is transparently transported over another MPLS network by inserting a special reserved label into the header stack. The hierarchy of MPLS networks comprises a client/server network hierarchy in one embodiment of the invention.

In one embodiment, said routing of MPLS traffic comprises a MPLS node performing a switching operation on the MPLS traffic.

In one embodiment, said routing of MPLS traffic comprises a MPLS node performing a forwarding operation on the MPLS traffic.

In one embodiment, said routing of MPLS traffic comprises a MPLS node performing a routing operation on the MPLS traffic.

In one embodiment, said client MPLS network is able to route traffic transparently from said first MPLS node to a second MPLS node in said client network using another said MPLS network in said hierarchy as a server network.

In one embodiment, the above method aspect further comprises:

an egress MPLS edge node of said server MPLS network receiving said MPLS traffic from said ingress MPLS edge node;

said egress MPLS edge node processing each received packet to remove the partition which was added by said ingress MPLS edge node; and said egress MPLS edge node performing a routing operation to forward said received MPLS traffic to an ingress MPLS edge node of said client MPLS network.

In one embodiment, said method is performed in a communications systems comprising a plurality of MPLS networks, wherein a first MPLS node in a first one of said plurality of MPLS networks is capable of being connected to an ingress MPLS edge node in another one of said plurality of MPLS networks, wherein the ingress MPLS edge node of the other network is capable of being connected to an egress MPLS edge node of the other MPLS network, and wherein the egress MPLS edge node of the other MPLS network is capable of being connected to a second MPLS node in the first MPLS network, and said method of routing traffic comprises:

routing traffic from said first MPLS node to the second MPLS node in the first MPLS network using the other MPLS network as a transport network;

said ingress MPLS edge node of said second network receiving MPLS traffic from said first MPLS node of said first MPLS network, said MPLS traffic comprising a plurality of packets; and said ingress MPLS edge node processing each received packet to partition the MPLS stack of each of said plurality of packets between the stack entries which are operable on by nodes in said first network and stack entries which are operable on by nodes in said second network.

In one embodiment, processing each received packet to partition the MPLS stack comprises the ingress MPLS edge node performing the steps of:

adding a network delimiter comprising a MPLS header having a stack partitioning value assigned to a label field, the network delimiter being added as a stack entry to the MPLS stack of the received packet, adding a further MPLS header to the MPLS label stack after the network delimiter stack entry to forward the received packet over the other MPLS network to the egress MPLS edge node.

Another aspect of the invention seeks to provide a communications system comprising a plurality of MPLS networks, said plurality of MPLS networks comprising:

a hierarchy of client and server MPLS networks, each MPLS network in said hierarchy comprising a plurality of nodes capable of interfacing with a node in a different level of said client and server hierarchy, such that at a layer in a MPLS network client and server hierarchy, the client MPLS network is able to route traffic from a first node to a second node in the client MPLS network using another MPLS network in said hierarchy as a server network, an ingress server MPLS node arranged to receive MPLS traffic from said first MPLS node of said client MPLS network, said MPLS traffic comprising a plurality of packets, said ingress MPLS node comprising:

processor means arranged to process each received packet to partition the MPLS stack of each of said plurality of packets between the stack entries which are operable on by nodes in said client network and stack entries which are operable on by nodes in said server network.

In one embodiment, a first MPLS node in a first one of said plurality of MPLS networks is capable of being connected to an ingress MPLS node in another one of said plurality of MPLS networks, wherein the ingress MPLS node of the other network is capable of being connected to an egress MPLS node of the other MPLS network, and wherein the egress MPLS node of the other MPLS network is capable of being connected to a second MPLS node in the first MPLS network,
  a method of switching/forwarding traffic from first node to the second node in the first MPLS network using the other MPLS network as a transport network, said method comprising the steps of:
  said ingress MPLS node of said second network receiving MPLS traffic from said first MPLS node of said first MPLS network, said MPLS traffic comprising a plurality of packets; and
  said ingress MPLS node processing each received packet to partition the MPLS stack of each of said plurality of packets between the stack entries which are operable on by nodes in said first network and stack entries which are operable on by nodes in said second network.

Another aspect of the invention seeks to provide a method of de-partitioning a header stack of a data packet, said header stack conforming to a label switching protocol and comprising a plurality of headers, each header comprises a label field to which a label value is assignable to enable a label switching node to route said packet in a network routing domain of a communications system, the communications system comprising a plurality of networks, the method comprising:
  receiving said packet at an edge node of a routing domain in said communications system;
  processing the label header stack at the edge node to remove a stack entry having a label field comprising a value which delimits the header stack entries between a stack domain configurable by said node belonging to a first routing domain of said label switching protocol and at least one other stack domain configurable by a node belonging to another routing domain of said communications system.

The header stack is de-partitioned by removing the partition in the header stack. Each part of the label stack reverts back to its disjoint form. In this way, after de-partitioning (i.e., after removing the boundary markers in the stack), the two label stacks are divided either physically or logically. For example, the two label stacks are physically/spatially disjoint when in their parent MPLS networks and/or are logically disjoint when one stack is carried over the other stack.

In any given data packet, a number of headers are appended according to one or more protocols (for example see FIG. 2), for example, there may be layer 2 and/or layer 3 headers present. An example of a header stack conforming to a label switching protocol is a multi-protocol label switching header stack.

The label field to which a label value is assignable enables a label switching node to perform a particular operation on the packet in the network routing domain, for example, routing, forwarding, etc. Not all labels will have a routing (for example a destination address (DA) proxy forwarding) semantic in some embodiments of the invention. Some labels have a source semantic, some have a local action semantic, etc. Accordingly, the label field enables the label switching node to take the appropriate action on the assumed label semantic.

Another aspect of the invention seeks to provide a label switching node arranged to implement a method of partitioning a header stack of a data packet, said header stack conforming to a label switching protocol and comprising a plurality of headers each of which comprises a label field to which a label value is assignable to enable the node to route said packet in a network routing domain of label switching protocol in a communications system comprising a plurality of networks, the method comprising the steps of:
  receiving said packet at said node;
  processing the label header stack at the node to add a stack entry having a label field comprising a value which delimits the header stack entries between a stack domain configurable by said node belonging to a first routing domain of said label switching protocol and at least one other stack domain configurable by a node belonging to another routing domain of said communications system.

Another aspect of the invention seeks to provide a communications signal comprising a plurality of data packets, each packet comprising a header and a payload, the header including a header stack comprising a plurality of header fields, all conforming to the same label switching protocol, wherein at least one header field is assigned a value denoting that after that header the stack entries for said header conforming to said label switching protocol are operable on by nodes in a different operational domain of said label switching protocol to the operational domain of nodes conforming to said label switching protocol which previously operated on the stack entries of the header field.

The operational domain may comprise a routing domain, or forwarding domain or any other suitable domain of action that a node can perform.

Another aspect of the invention seeks to provide a communications signal comprising a plurality of data packets, each packet comprising a header field and a payload, the header field including a header stack comprising a plurality of header fields, at least one of said plurality of header fields having been added by a different label distribution protocol to the label distribution protocol of another one of said plurality of header fields, wherein at least one header field is assigned a value denoting that after that header the stack entries for said header conforming to said label switching protocol are operable on by nodes in a different routing domain of said label switching protocol to the routing domain of nodes conforming to said label switching protocol which previously operated on the stack entries of the header field.

In some embodiments of the invention, the label field values in the header stack are added by different types of label distribution protocols.

The MPLS header fields may be contributed by networks associated with different domains of control. In some embodiments of the invention, the stack of MPLS headers all belong to the same network party.

Another aspect of the invention seeks to provide a communications system comprising a plurality of multi-protocol label switching communication networks, each said communication network comprising a plurality of network nodes arranged to implement a multi-protocol label switching operational domain, the system comprising: a boundary node between two of said communication networks comprising: a receiver arranged to receive a multi-protocol label switching traffic unit; and one or more processors arranged to process a multi-protocol label switching header stack of said received traffic unit to include a delimiting label field value which indicates an operational boundary of the multi-protocol label switching operational domains of said two communications networks.

In one embodiment, said node is an ingress node to one of said two communication networks, and wherein said node further comprises one or more processors arranged to: process the header stack after said operational boundary label field value has been assigned to include one or more other multi-protocol label switching header field values enabling one or more operations to be performed on said traffic unit by other nodes within the operational domain of said communication network of said ingress node.

In one embodiment, said delimiting label field value is processed by another node in said communication network, any label field value assigned to said header stack by a node in the operational domain of the other one of said two communication networks is not operated on.

In one embodiment, a node receiving said traffic unit in said communication network processes said header stack only up to said delimiting label field value and ignores any label field value assigned to said header stack by a node in the operational domain of the other one of said two communication networks.

In one embodiment, the type of multi-protocol label switching protocol differs between at least two of said plurality of communications networks.

The partitioning scheme according to the invention treats the IP addresses in the client MPLS layer network as irrelevant and the client IP addresses do not need to be known in the server layer MPLS network. Instead, the invention carries the client layer MPLS network transparently over the server layer MPLS network.

The aspects of the invention are as set out above and by the accompanying independent claims and the preferred embodiments are as set out above and by the dependent claims. The aspects and preferred embodiments may be combined in any appropriate manner apparent to those of ordinary skill in the art.

The preferred embodiments of the invention will now be described with reference to the accompanying drawings which are by way of example only and in which:

FIGS. 1A to 1C show various views of a conventional MPLS header;

FIG. 4A shows a communications system within which a MPLS transport scheme can be implemented according to one embodiment of the invention;

FIG. 4B shows more detail of a MPLS transport network scheme according to one embodiment of the invention;

FIG. 4C shows a partitioned MPLS stack according to one embodiment of the invention;

FIGS. 5A and 5B show partitioned MPLS stacks according to one embodiment of the invention, in which the partitioning MPLS stack entry has S=0;

FIGS. 6A and 6B show partitioned MPLS stacks according to an alternative embodiment of the invention, in which the partitioning MPLS stack entry has S=1;

Figure 2:
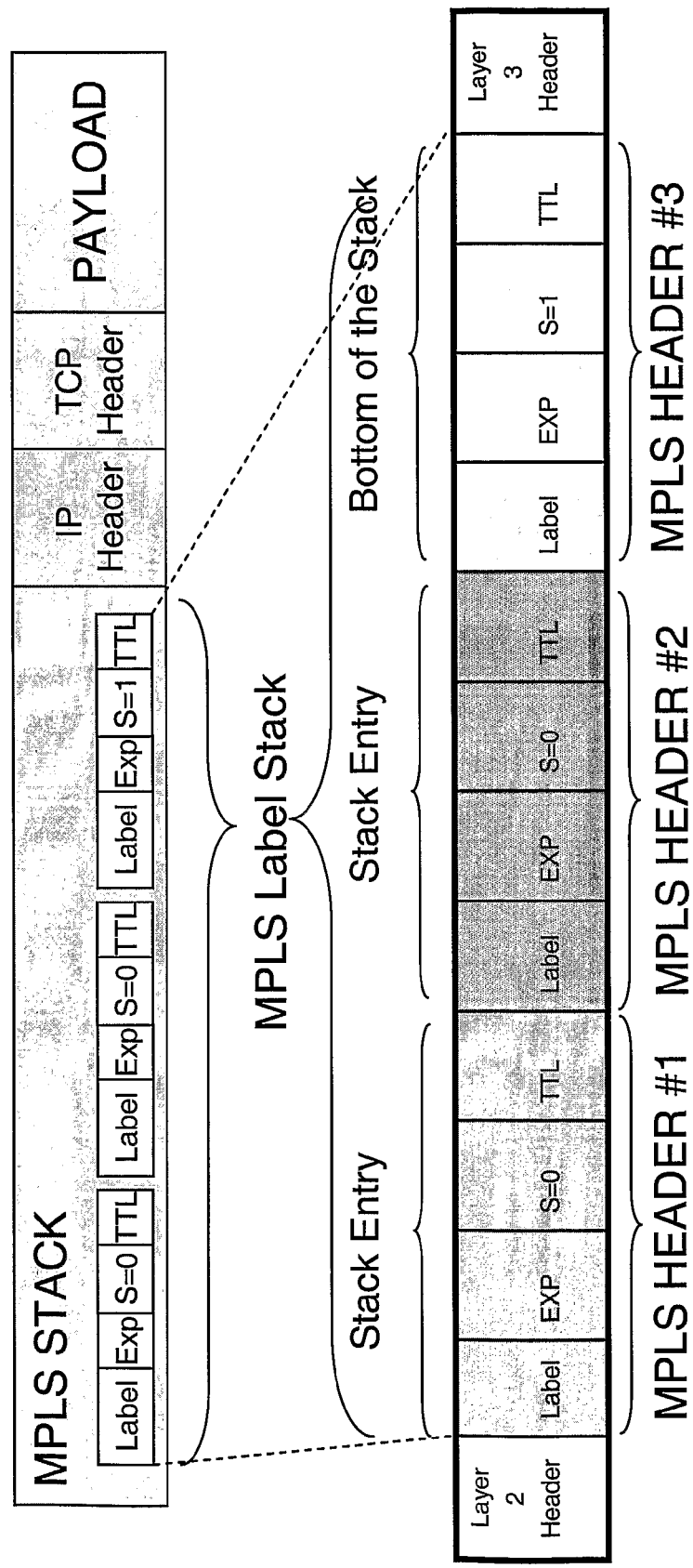
FIG. 2 shows expanded views of how MPLS fields are stacked in a MPLS header.

The best mode of the invention currently contemplated by the inventors and the preferred embodiments will now be described. Those of ordinary skill in the art will appreciate that it is obvious that a particular component or step includes certain features whose presence is essential for implementing the invention even if such features have not been explicitly recited (this is for the sake of clarity and brevity in the description and their inclusion is considered implicit unless explicit reference is made to the contrary). All technical terms described herein retain the meaning assigned to them by RFC 3031 and RFC 3032 (as referred to hereinabove) unless a contrary indication is explicitly given.

The term traffic unit refers to a packet, cell, and frame and/or to any other suitable component of traffic. Each type of traffic unit is used herein as a synecdoche for the other types of traffic units and treated equivalently for the purposes of the invention. For consistency with RFCs 3031 and 3032 which refer to the term MPLS "packet", this term shall be used herein for consistency but the reader who is skilled in the art will understand that references to a packet are references to any suitably equivalent type of traffic unit unless the context of the word "packet" clearly indicates otherwise.

FIG. 4A shows a communications system 1 according to the invention which comprises a plurality of networks 2, 3 each comprising a plurality of nodes 4a, 4b, 5a, 5b.

The nodes 4a, 4b, 5a, 5b of each network are arranged to implement label switching or forwarding on received traffic packets, and in one embodiment comprise label switching routers (LSRs) implemented in accordance with a standard multi-protocol label switched (MPLS) communications protocol.

According to the invention, within each network 2, 3, at least a plurality of nodes 4a, 4b, 5a, 5b are adapted to interface with at least one other of said plurality of networks. These nodes, which comprises externally facing interfaces with another network, are referred to herein as edge nodes. Depending on the direction of the traffic flow on which the edge node operates the label switching/forwarding operation, the edge node either functions as an ingress node for a traffic flow entering into that particular network or as an egress node for a traffic flow leaving that particular network.

Each network 2, 3 can have the same or a different type of control and/or management plane technology from the other networks in the communications system. Within each network 2, 3, however, all nodes are within the same operational (for example, routing) domain, i.e. in FIG. 4A nodes 4a and 4b belong to one operational (for example, routing) domain, whilst nodes 5a and 5b belong to a different operational (for example, routing) domain. In one embodiment of the invention, two or more (or all) of the plurality of networks forming the communications system can have the same administrative domain. In another embodiment of the invention, two or more (or all) of the plurality of networks forming the communications system have different administrative domains.

Accordingly, the communications system 1 comprises two or more distinct MPLS networks, each MPLS network comprising at least a different instance of control-plane, and in some embodiments all functional components such as the control-plane, management plane and data plane are independent in each of the MPLS networks. These two or more MPLS networks belong to the same operating party (for example, perhaps to different lines of business for the same operator) in one embodiment of the invention, but in alternative embodiments they belong to different operating parties (for example, different network operators).

As mentioned hereinabove, in FIG. 4A of the accompanying drawings an embodiment of the invention is shown in which the plurality of networks comprises two MPLS networks 2, 3 indicated as MPLS network A and MPLS network B. There are two edge nodes A1 and A2 in MPLS network A and two edge nodes B1 and Bn in MPLS network B, and a label switched path (LSP) 6 denoted by the dashed curved arrow runs from A1 via B1 and Bn to A2. Nodes A1 and A2 are within the operational (for example, routing) domain of network A and nodes B1 and Bn are within the operational (for example, routing) domain of network B.

The term MPLS node is defined to be consistent with RFC 3031 which refers to a MPLS node as a node capable of running MPLS and which is aware of MPLS control protocols, operates one or more routing protocols, and is capable of forwarding packets based on labels. In FIG. 4A, nodes 4a, 4b and 5a, 5b form part of separate MPLS network domains. In accordance with RFC 3031, a MPLS network domain comprises a contiguous set of nodes which perform a MPLS operation, such as routing and forwarding, and which are also in one routing domain.

For clarity, in each of the two MPLS networks 2, 3, only two edge nodes A1 and A2 (for example, LSRs) are shown residing within MPLS network A and only two edge nodes B1 and Bn (also, for example, LSRs) are shown in FIG. 4A. However, those of ordinary skill in the art will appreciate that each MPLS network in any practical deployment is likely to comprise a plurality of nodes, and several may provide core and edge node functionality.

In one embodiment of the invention, the administrative control of network A is different from that of network B, for example, network A is in the domain of control of a first network operator "A", and the administrative control of network B is in the domain of control of another network operator "B". In alternative embodiments, however, the operator entities "A" and "B" may be the same.

Consider the scenario where operator A would find it advantageous to send traffic (MPLS packetised data) along an LSP 6 from node A1 via nodes B1 and Bn to another node A2 over the MPLS network of operator B. This would require packets to enter a MPLS network B via the ingress edge node B1 and to leave MPLS network B at egress edge node Bn. As will be apparent to those of ordinary skill in the art, in practice the LSP 6 may transit several nodes in operator B's network between nodes B1 and Bn.

Conventionally, when MPLS traffic is transmitted between LSRs in a MPLS network, each LSR consults a routing table comprised of MPLS label information which is known as the Label Information Base (LIB). Each LSR performs a look-up operation on the LIB using the ingress interface and ingress label of a received MPLS packet which enables the egress interface and egress MPLS label to be determined, and the LSR then substitutes the outbound label for the incoming label before forwarding the received packet via the egress interface indicated by the LIB. Although each label is only relevant on a particular link between adjacent LSRs, collectively the LSR tables will establish a Label Switched Path over the MPLS network. A MPLS stack comprises a plurality of MPLS labels and only the outermost (last) label is conventionally used for forwarding. The outermost MPLS label is "popped" (i.e., removed) by indicating an appropriate entry in an LSR label table. This enables one or more MPLS labels to be removed at egress LSRs by providing an appropriate indication in the LIB at that LSR. However, for operator A to use operator B's MPLS network as a transport network in a manner which allows the S bit (and indeed all other functions) to be used, independently in the two MPLS networks requires some means of preventing the stack entries associated with network A from being operated on by the LSRs associated with network B. This will enable a client/server relationship to be established with a network A MPLS node functioning in a client role and a network B MPLS node functioning in a server role. This allows, as FIG. 4A shows, the MPLS node A1 to be peered directly with the MPLS node A2, and for MPLS nodes B1 and Bn to establish a server transport capability for operator A's traffic.

This requires a partition mechanism to exist in the MPLS stack so that operator B's edge and core MPLS nodes (B1, B2 . . . Bn) have no ability to control the labelling assigned by MPLS nodes (A1, A2) in the client MPLS network of operator A.

The partition mechanism of the invention allows such a client/server relationship to be established between the two MPLS networks 2, 3 and, referring now briefly to FIG. 4C, addresses the problem associated with adding a new MPLS header 8b from network B to a MPLS stack 11 comprising those MPLS headers 8a already applied by network A. The stack partition 9 proposed by the invention acts as a buffer or network delimiter between the two MPLS stack control domains, i.e., it partitions the network stack entries shown in FIG. 4C and enables the S bit to be set independently in the MPLS stack entries for each of the two MPLS networks.

A potential benefit of the invention is the provision of a MPLS transport network scheme in which the invention is not prescriptive regarding the type of section layer technology that interconnects the client devices to the server devices. Whilst in one embodiment, the same communications technology supports communications between the client devices and the servers as each end of the LSP, in alternative embodiments, this need not be so.

Figure 3A:
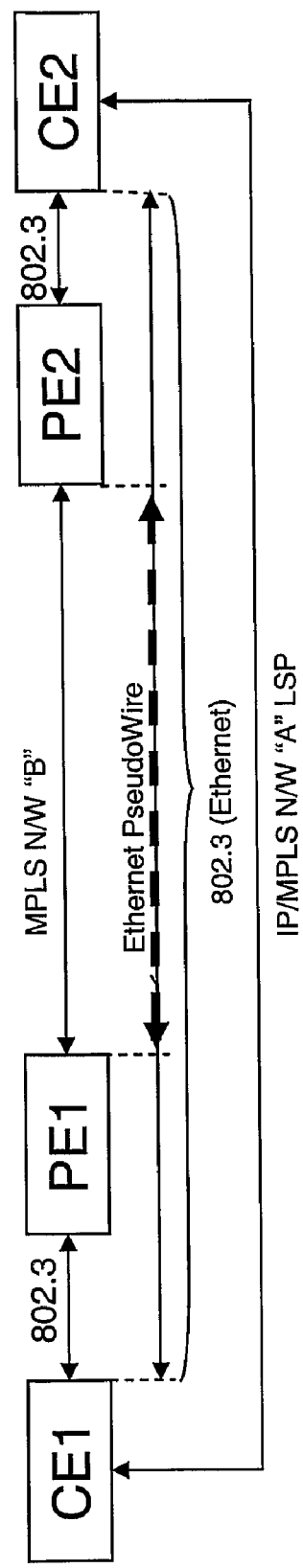
FIG. 3A shows a prior art MPLS transport network scheme.
Figure 3B:
FIG. 3B shows how an intermediate technology (Ethernet) separates two separate MPLS transport stacks in the prior art scheme shown in FIG. 3A.

In FIG. 4B, the layout of the drawing is such that the differences from the prior art scheme shown in FIG. 3A are more apparent yet the elements of the communication system are labelled for consistency with those elements shown in FIG. 4A. FIG. 4B of the accompanying drawings shows how in one embodiment of the invention, the technology supporting communication between the edge nodes A1 and B1 (CE1 and PE1 in FIG. 3A) (i.e., the communications protocol) differs from that used between B1 (PE1) and Bn (the provider equipment PE2 in FIG. 3A) and this can differ from that used between Bn (PE2) and A2 (the customer equipment CE2 in FIG. 3A). Thus in FIG. 4B, between A1 and B1 a first communications protocol is used (corresponding to a first type of section layer technology shown as layer 2 #1 in FIG. 4B) whereas between Bn and A2 a different section layer communications protocol is used (shown as layer 2 #2 in FIG. 4B). In each case, between B1 and Bn no intermediate end-to-end layer network technology exists—the MPLS traffic of network A is not separated by any intermediate technology headers from that of network B. Although referred to as layer 2 in FIGS. 4A and 4B, the layers 2 #1 and 2 #2 need not always refer to the OSI protocol hierarchy. In some embodiments of the invention, the section layer refers to any appropriate connection-oriented circuit switched (CO-CS), connection-oriented packet switched (CO-PS), or connectionless packet switched (CL-PS) as appropriate depending on the particular embodiment of the invention. For example, the term layer 2 can be used by those of ordinary-skill in the art to refer to a CO-PS layer and the term layer 3 can be used to refer to a CL-PS layer.

In the context of some embodiments of the invention, the term section layer refers to the very bottom of a network stack (i.e., the real or physical layer) where the information (from the higher layer binary signals) need to be encoded (lexicon mapping) into a form suitable for modulation on an electromagnetic wave (which may be guided on a solid physical medium such as copper or optical fibre or comprise a free-space electromagnetic wave propagating as a radio wave for example). As MPLS does not have a section layer specification, it relies on having some other layer network technology (even if a degenerate network such as a point-to-point one hop network) below the MPLS layer. In some embodiments of the invention, these lower layer networks are true networks, in the sense that they create multi-hop switched connections in their own right.

In FIG. 4C a single MPLS stack is partitioned between stack entries whose labels have been assigned values by devices within network A and stack entries whose labels have been assigned values by devices within network B. The header 11 of the MPLS packet shown comprises a layer 2 header component 7, a layer 3 header component 10, and a MPLS header stack 12. In this embodiment, the MPLS header stack 12 comprises two MPLS network headers (8a and 8b) with a network delimiter stack entry 9 providing a functional partition between the sets of stack entries 8a, 8b which belong to the different routing domains of MPLS network A and MPLS network B respectively. The network delimiter stack entry 9 enables the two layer MPLS networks to implement a network hierarchy, for example, by operating in a client/server sense.

In this way, the invention enables a single MPLS stack to carry MPLS headers conforming to the different values assigned in each network and to keep the MPLS networks functionally independent. Here the terms layer 2 and layer 3 can refer to OSI layers and/or, in some embodiments, layer 2 simply refers to any appropriate connection-oriented packet switched layer technology and layer 3 to any appropriate connection-less packet switched layer technology.

The invention seeks to define a predetermined value which is assigned to the 20-bit MPLS label field and which either alone or in conjunction with other MPLS header fields indicates that the MPLS header stack is subdivided into sub-partitions which each contain header values assigned independently by apparatus within a particular MPLS network domain. By ensuring that each MPLS network domain does not attempt to reassign values to the header fields set in another MPLS network domain, the above mentioned limitations in the art as regards MPLS transport networks are mitigated and/or obviated. Advantageously, by partitioning the MPLS header stack into differing network domains it enables recursive use of the MPLS header stack so that multi-depth transport networks can be hierarchically provided such as are shown schematically in FIGS. 7A and 7B of the accompanying drawings and described later herein below.

The invention comprises inserting a stack partition value into the label field of a MPLS stack entry which has the functionality of separating the MPLS stack into two or more separate stack control domains, each stack control domain being associated with a separate MPLS network. In this way, the stack partition value functions as a network delimiter. Stack entries whose values have been assigned by the control or management plane of one network operator are separated from those entries assigned values by another network operator by the network delimiter stack entry with the stack partition label value. Thus the network delimiter according to the invention comprises a MPLS stack entry whose label field has been assigned the stack partition value by a server MPLS network domain.

The network delimiter is inserted by the adaptation function between the client and server MPLS networks, which is implemented by the server layer network. A MPLS packet from the client MPLS network (network A referring back to FIG. 4A) is presented to the server MPLS network (network B in FIG. 4A) and the ingress node B1 at the edge of the server layer MPLS attaches two new MPLS headers to the MPLS stack. The first MPLS stack entry contains the network delimiter (comprising a MPLS header with the predetermined stack partitioning value) and the second header is a "normal" MPLS header that is used for forwarding across the server layer network. At the egress edge node (Bn as shown in FIG. 4A) of the server MPLS network B both of these stack entries are removed and the client MPLS packet is presented to the client MPLS network A. The egress edge node Bn will only be able to "see" the "network delimiter" stack entry after the egress edge node Bn has popped its final forwarding header. The revealed network delimiter label tells the edge node Bn that the next header is a MPLS packet belonging to a different MPLS network.

As each node along an LSP does not add a new labelled header in normal forwarding, if node B1 applies the two headers 'stack delimiter'+'normal forwarding', the 'normal forwarding' header gets swapped between B2 and B3, between B3 and B4, etc until the packet is received by node Bn. This means that the stack depth remains at two along the LSP from B1 to Bn, and the 'stack delimiter' header is only observed at B1 (the node adding it) and Bn (the node removing it). In some embodiments, more headers are added to the packet en-route between B1 and Bn, but these create a lower LSP between the nodes adding the header(s), e.g., between some arbitrary intermediate nodes Bk and Bm that lie between B1 and Bn. The intermediate nodes Bk and Bm add/remove these additional header(s) respectively so that they are not present when the packet arrives at Bn for example.

An example of what is described above is shown in FIGS. 5A and 5B. In FIGS. 5A and 5B, examples of two-layer MPLS network header stacks are shown. FIGS. 5A and 5B show that the presence of the predetermined "partition" value in the label field of a stack entry in conjunction with a S=0 bit indicates that MPLS headers above and below the network delimiter belong to different MPLS networks. Each of these will usually be under different administrative control.

In FIG. 5A, there is only one S=1 stack entry in the MPLS stack, which is consistent with current MPLS standards such as those outlined in RFCs 3031, 3032 etc, and within the partition for network B, the S bit is set to 0 for the label stack entries (#B1 and #B2). FIGS. 5B, 6A and 6B show alternative embodiments which allow within each stack control domain associated with a particular MPLS network for one S=1 bit to be set.

In FIG. 5B, in each partition of the MPLS stack, the stack entry closest to the layer 3 header end of the MPLS stack is assigned the S=1 bit, and the network delimiter is assigned an intermediate S=0 value. FIGS. 6A and 6B show an alternative embodiment in which the network delimiter is instead not denoted by the S=0 bit but is associated with a S=1 bit, but different embodiments of the invention may assign different values to the S-bit of the network delimiter.

Referring again to FIG. 4A, a MPLS transport scheme according to one embodiment of the invention will now be described in more detail for a left to right traffic flow (as shown by the arrowed dotted line in the drawing). For a bi-directional service, similar functions will be provided in the reverse direction. To implement the transport scheme according to the invention, operator B sets up (by any mechanism) a standard MPLS LSP, referred to herein as LSP_X, between nodes B1 and Bn. LSP_X would normally have a single MPLS labelled header and the forwarding label would usually (but not necessarily always) be swapped on each hop. Besides containing the forwarding label the other MPLS header fields will be encoded as follows: S=1, EXP=any that is deemed to offer sufficient performance for the purposes of the MPLS client packets from network A that this LSP_X will eventually carry, TTL=any length of time that is sufficient to get from B1 to Bn. In one embodiment, PHP is used on the LSP_X but it is not in the best mode of the invention contemplated by the inventors. This is to ensure that the normal MPLS forwarding header, and specifically the last hop forwarding label therein, is visible at node Bn. This provides a clear indication of which packets received by node Bn are associated with LSP_X and not any other LSP that terminates at node Bn.

B1 is configured in any conventional way known to those of ordinary skill in the art to expect to receive MPLS packets from node A1 of operator A on some input port of node B1. The MPLS packets from node A1 can have any allowed values of label, S, EXP, and TTL. These MPLS packets are to be carried transparently in a hierarchical (for example, client/server) manner by the MPLS network of operator B using the MPLS transport scheme of this embodiment of the invention. The server section layer that connects node A1 and B1 is any suitable communication technology capable of carrying MPLS packets transparently in a hierarchical (for example, client/server) manner, e.g. Ethernet, known to those of ordinary skill in the art. The 'connection' for that communication technology between A1 and B1 is fully functionally terminated at A1 and B1, i.e. it specifically does not extend across operator B's MPLS network.

Another server section layer technology 'connection' is also established between the nodes Bn and A2 and satisfies the same requirements as that for the server layer connection between A1 and B1 noted above. Whilst in some embodiments of the invention the server section layer technology between A1 and B1 and that between Bn and A2 is different, in other embodiments the same server section layer technology is provided between A1 and B1 and also between Bn and A2. In general, the manner of establishing server section layer technology connections between A1 and B1 and between Bn and A2 has no impact on the provision of a MPLS transport network scheme according to the invention.

Referring again to FIG. 4A of the drawings, when a MPLS packet from node A1 arrives at node B1, node B1 performs, at least the following operations on the MPLS stack of the received packet:
  (i) adding a MPLS header comprising the network delimiter to the MPLS packet that came from node A1; and
  (ii) adding a further MPLS header after the network delimiter header which is of the type that B1 would normally assign to forward packets from B1 to Bn along LSP_X referred to hereinabove.

The network delimiter added by B1 contains a label field to which is assigned a Stack Partitioning value. This effectively indicates that that part of the MPLS network stack is terminated and that following the network delimiter are MPLS stack entries belonging to a different MPLS network. Other fields of the network delimiter stack entry are also assigned appropriate values by the ingress node B1 for network B such as the S-bit (e.g. S=0 (recommended), though S=1 could also be used), the EXP field (e.g. EXP=any) and the TTL field (TTL=1 recommended). The field value for TTL (TTL=1 recommended though other TTL values could be used) is assigned to prevent the packet being incorrectly forwarded should it get misdelivered.

The further MPLS header added by B1 to the MPLS stack is also assigned values in the normal way for MPLS headers in network B, e.g., the S-bit is set to S=0 (recommended, though in principle S=1 could be used if this is a bottom of stack normal forwarding header in network B between B1 and Bn), the EXP field value is set to any that is deemed to offer sufficient performance for the purposes of the MPLS client packets from network A that this LSP_X will carry, and the TTL field value is set to any value sufficient for the packet to get from B1 to Bn.

The MPLS packets from node A1 when encapsulated as described hereinabove are then transparently transported across operator B's network (in LSP_X) until they arrive at node Bn. When node Bn removes the normal MPLS forwarding header of LSP_X it will expose the network delimiter stack entry. This indicates that there is a further set of one or more MPLS headers in the MPLS stack after the network delimiter stack entry that belong to a different MPLS network, i.e., in this case the MPLS network of operator A. Node Bn then removes the network delimiter stack entry and, because of prior configuration, knows which port to send this out of node Bn on to reach node A2 in operator A's network.

One embodiment of the invention uses a label signalling protocol, for example LDP or RSVP-TE, to distribute the labels between nodes (e.g. from node Bn to node B1) and configure the nodes. All labels, including the stack partition label, can be distributed in such a manner within the relevant MPLS network. In other embodiments the label distribution and configuration might be carried out by management and/or OSS techniques. These are conventional techniques already known to those of ordinary skill in the art.

Figure 7A:
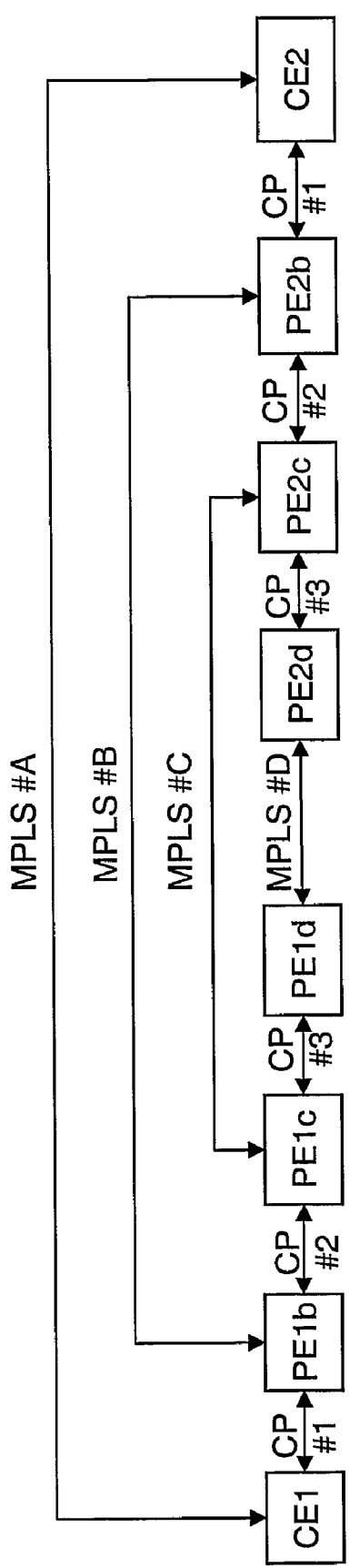
FIG. 7A shows a communications system for which a recursively stacked MPLS transport scheme according to one embodiment of the invention is provided.
Figure 7B:
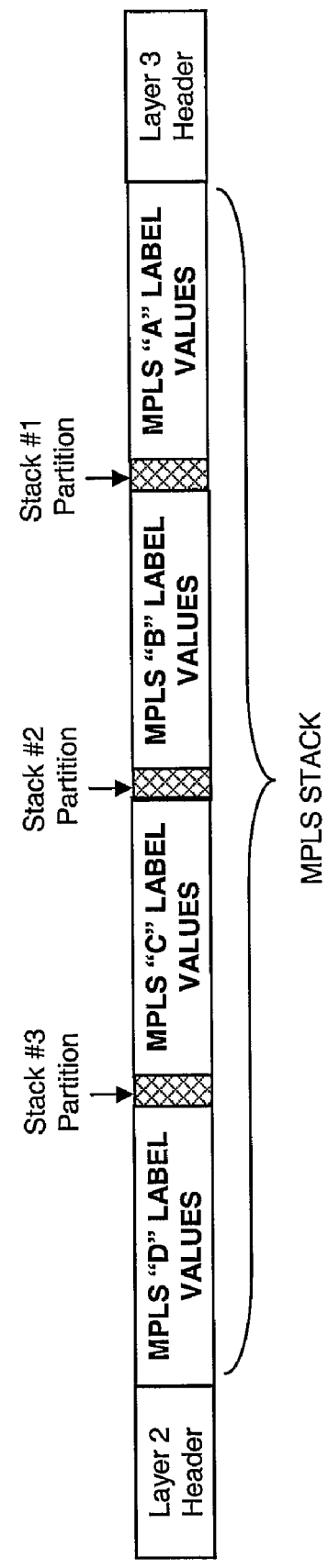
FIG. 7B shows how a MPLS stack is multiply partitioned to implement an embodiment of the invention for the communications system shown in FIG. 7A.

FIGS. 7A and 7B of the accompanying drawings show how the invention can be extended to refer to a multi-layer case of MPLS networks comprising a hierarchy of client/server relationships. As shown in FIG. 7A, MPLS traffic from the network of operator A uses the MPLS network of operator B as a transport network, who in turn uses the MPLS network of operator C as a transport network, who in turn uses the MPLS network of operator D as a transport network. FIG. 7B shows a multi-partitioned MPLS stack in which a plurality of stack partitions #1, #2, #3 are shown. This enables the MPLS stack entries of each network operator to remain concatenated together in the MPLS stack through the data-plane encapsulation technique proposed by the invention for MPLS traffic.

The MPLS stack partition values are attached as network delimiter stack entries by appropriately configuring the ingress and egress LSRs in each network domain by network management and/or the MPLS signalling using any conventional technique known to those of ordinary skill in the art (such as those described briefly herein above) with reference to the two layer embodiment of the invention.

One embodiment of the invention does not force a relationship between the stack partitioning value used in network A and any stack partitioning value used in network B. Nor is any relationship required between any of the stack partitioning values used for network delimiters in embodiments of the invention implemented for a three or more layer MPLS transport network (such as those where the MPLS transport network scheme of the invention is used in a recursive stacked manner as is shown in FIGS. 7A and 7B (for example, MPLS-over-MPLS-over-MPLS, etc.)).

In one embodiment of the invention, a globally reserved value (i.e. one of those remaining in the reserved label set 0-15) is assigned to the stack partitioning value which all MPLS networks use. Use of a globally reserved value is not essential however to implement the invention. Any value can be used for the stack partitioning value providing that the MPLS network that assigns that value to an LSP can ensure that it is understood within the context of the LSP that carries it. It may or may not be unique within that MPLS network.

Many modifications and functional equivalents to the features of the invention described herein will be apparent to those of ordinary skill in the art and unless specifically excluded by the description such modified and functionally equivalent features are intended to be implicitly included in the description, as are any features essential to implement the invention whose omission for the sake of clarity and brevity is apparent to those of ordinary skill in the art.

The term technology may refer to section layer technology in some embodiments of the invention unless the context of the term indicates otherwise. For example, "communications technology supporting communications between edge nodes" may refer to "section layer" technology in an embodiment of the invention.

The term "multi-protocol label switched" or "multi-protocol label switching" and the acronym "MPLS" is used herein to refer to standard protocols and implicitly to any variant protocols which have similar header structural constraints, such as, for example, Transport MPLS (T-MPLS, TMPLS is being supported by the International Telecommunications Union (ITU) and more information on TMPLS can be found on the web-site http://www.transport-mpls.com) etc. Accordingly, where appropriate in the description hereinabove, the term MPLS should be construed to include variations and derivative protocols associated with the MPLS protocol such as T-MPLS etc.

The term traffic unit, packet, cell, and frame are all intended to be synecdoches for each other as they are treated equivalently for the purposes of the invention, although RFCs 3031 and 3032 referred to hereinabove use the term MPLS "packets", which shall be the terms used herein for consistency.

References to layer 2 and layer 3 may refer herein to OSI layer 2 (data-link) and layer 3 (network) technology and/or to connection-less packet switched and connection-oriented packet-switched (or connection-oriented circuit-switched) communications protocols as is apparent to a person of ordinary skill in the art.

The text of the abstract is repeated herein-below to form part of the description: a method of partitioning the header stack of a data packet, said header stack conforming to a label switching protocol and comprising a plurality of headers each of which comprises a label field to which a label value is assignable to enable a label switching node to route said packet in a network routing domain of label switching protocol in a communications system comprising a plurality of networks, the method comprising the steps of: receiving said packet at an edge node of a routing domain in said communications system; and processing the label header stack at the edge node to add a new stack entry having a label field comprising a value which delimits the header stack entries between a stack domain configurable by said node belonging to a first routing domain of said label switching protocol and at least one other stack domain configurable by a node belonging to another routing domain of said communications system, whereby a MPLS transport network scheme can be implemented.

The invention claimed is:

1. A method of partitioning a header stack of a traffic unit, said header stack conforming to a label switching protocol and comprising a plurality of headers each of which comprises a label field to which a label value is assignable to enable a label switching node to operate on said traffic unit in a respective operational domain of a label switching protocol communications network in a communications system comprising a plurality of label switching protocol communications networks, the method comprising of:
 receiving said traffic unit at an edge node of a first operational domain of said communication system; and
 processing the header stack of said traffic unit at the edge node to add a new stack entry having a label field comprising a value which marks the boundary of one or more header stack entries forming a first stack domain of said header stack configurable by one or more label switching nodes arranged to operate on said traffic unit in said first operational domain of said communications system and at least one other stack domain of said header stack in which one or more header stack entries are configurable by one or more label switching nodes belonging to another operational domain of said communications system.

2. The method as claimed in claim 1, wherein said label switching protocol comprises a multi-protocol label switching protocol.

3. The method as claimed in claim 1, wherein said label switching protocol comprises a transport multi-protocol label switching protocol.

4. The method as claimed in claim 1, wherein the traffic unit comprises a data packet.

5. The method as claimed in claim 1, wherein the operational domain comprises a routing domain and wherein said label value is assignable to enable a label switching node to operate on said traffic unit by routing said traffic unit in a respective routing domain of the communications network.

6. The method as claimed in claim 1, further comprising iterating receiving said traffic unit and processing the header to add a stack entry having a delimiting value more than once to mark the boundaries of the header stack entries to partition the header stack into additional stack domains.

7. The method as claimed in claim 1, further comprising iterating receiving said traffic unit and processing the header stack to add a stack entry having a delimiting value more than once to mark the boundaries of the header stack entries to partition the header stack into additional stack domains, wherein each additional stack domain is partitioned by a stack entry having a different delimiting value.

8. The method as claimed in claim 1, further comprising iterating receiving said traffic unit and processing the header stack to add a stack entry having a delimiting value more than once to mark the boundaries of the header stack entries to partition the header stack into additional stack domains, wherein each additional stack domain is partitioned by a stack entry having the same delimiting value.

9. The method as claimed in claim 1, wherein the value assigned to the label field of a header which delimits the header stack entries comprises a reserved value according to the label switching protocol.

10. The method as claimed in claim 1, wherein said stack entry having a delimiting value is indicative that the header stack is to be partitioned at that point such that other nodes in the same routing domain as said edge node are only capable of operating on one more additional headers added to the header stack that were applied by the same routing domain that added the stack delimiting value.

11. An apparatus arranged to partition a header stack of a traffic unit in a communications network, said header stack conforming to a label switching protocol and comprising a plurality of headers each of which comprises a label field to which a label value is assignable to enable a label switching node to operate on said traffic unit in a network operational domain of said label switching protocol in a communications system comprising a a plurality of network operational domains, the apparatus comprising:
 a receiver arranged to receive said traffic unit at an edge node of at least one of the network operational domains in said communications system; and
 one or more processors arranged to process the header stack of said traffic unit at the edge node to add a new stack entry having a label field comprising a value which delimits the header stack entries between a stack domain configurable by said label switching node belonging to said network operational domain of said label switching protocol and at least one other stack domain configurable by a node belonging to another network operational domain of said communications system.

12. The apparatus as claimed in claim 11, wherein said traffic unit comprises a data packet.

13. The apparatus as claimed in claim 11, wherein said network operational domain of said label switching protocol comprises a routing domain of said label switching protocol and wherein said label field to which a label value is assignable enables said label switching node to route said traffic unit.

14. The apparatus as claimed in claim 11, wherein said receiver and said one or more processors partition the header stack into additional stack domains.

15. The apparatus as claimed in claim 11, wherein said receiver and said one or more processors arranged to process the header stack of said traffic unit partition the header stack into additional stack domains, wherein each additional stack domain is partitioned by a stack entry having a different delimiting value.

16. The apparatus as claimed in claim 11, wherein said receiver and said one or more processors arranged to process the header stack of said traffic unit partition the header stack into additional stack domains and wherein each additional stack domain is partitioned by a stack entry having the same delimiting value.

17. The apparatus as claimed in claim 11, wherein the value assigned to the label field of a header which delimits the header stack entries comprises a reserved value according to the label switching protocol.

18. The apparatus as claimed in claim 11, wherein said new stack entry having a delimiting value is indicative that the header stack is to be partitioned at that point such that other nodes in the same network operational domain as said edge node are only capable of operating on one more additional headers added to the header stack that were applied by the same operational domain that added the stack delimiting value.

19. A method of removing a header stack domain boundary marking in a header stack of a traffic unit in a communications system comprising a plurality of multi-protocol label switched communications network operational domains, said header stack conforming to a label switching protocol, wherein a header stack domain comprises one or more header label field values, the label field values in a respective stack domain being operable on by a multi-protocol label switching node in a respective one of said plurality of operational domains, the method comprising the steps of:
  receiving said traffic unit at an edge node of a first one of said plurality of operational domains; and
  processing the header stack of said traffic unit at the edge node to remove a stack entry having a label field comprising a value which marks a boundary of the header stack entries configurable by a label switching node in said first one of said operational domains and the header stack entries forming a stack domain in which a header field value is configurable by a label switching node belonging to another one of said plurality of operational domains.

20. A communications system comprising:
a plurality of multi-protocol label switching communication operational domains, each said communication network operational domain comprising a plurality of network nodes;
a boundary node between two of said multi-protocol label switching communication network operational domains, the boundary node comprising:
  a receiver arranged to receive a multi-protocol label switching traffic unit from a first one of the two said multi-protocol label switching communication network operational domains; and
  one or more processors arranged to process a header stack of said received multi-protocol label switching traffic unit to include in said header stack a delimiting label field value to indicate an operational boundary of said first one of the two said multi-protocol label switching communication network operational domains.

21. The system as claimed in claim 20, wherein said boundary node is an ingress node to a second one of said two multi-protocol label switching communication network operational domains, and wherein said boundary node further comprises:
  one or more processors arranged to process the header stack of said received multi-protocol label switching traffic unit after said delimiting label field value has been assigned to further include in said header stack one or more other multi-protocol label switching header field values enabling one or more operations to be performed on said traffic unit by other nodes within the second one of said two multi-protocol label switching communication network operational.

22. A method of partitioning a header stack of a label switching protocol traffic unit, the method comprising:
  receiving said label switching protocol traffic unit at an edge node of a first label switching protocol communications network operational domain in a communications system, wherein within said first operational domain one or more label field values are assigned to enable one or more label switching nodes in said first operational domain to operate on said traffic unit;
  processing the header stack at the edge node to add a label field to the header stack having a label field value indicating a boundary of the header stack, said boundary label field value indicating label field values entries configurable by said one or more nodes belonging to said first label switching protocol communications network operational domain form a first stack domain which is bounded by said label field with said boundary field value, whereby
  subsequent header field values added to said header stack form at least one other stack domain, each said at least one other stack domain comprising header fields having header field values configurable by one or more nodes belonging to another label switching protocol communications network operational domain of said communications system.

23. A communications system comprising:
a plurality of multi-protocol label switched communications network operational domains, each domain comprising at least one node arranged to assign a value to a header field of a header in a multi-protocol label switched traffic unit;
an edge node comprising:
  a receiver for receiving said multi-protocol label switched traffic unit from a first of said plurality of multi-protocol label switched communications network operational domains, wherein at said edge node, said header comprises at least one label field value configurable by a node belonging to said first of said plurality of multi-protocol label switched communications network operational domains;

a processor for processing a header stack at the edge node to add a new entry to said header stack, said entry comprising a label field having a stack domain boundary value marking a boundary of a header stack domain comprising said at least one label field value configurable by said node belonging to said first of said plurality of multi-protocol label switched communications network operational domains; and a node in another one of said plurality of multi-protocol label switched communications network operational domains arranged to add one or more subsequent header fields and values to said header stack, wherein said subsequently added header fields form a stack domain for said another one of said plurality of multi-protocol label switched communications network operational domains.

24. A method of partitioning a header stack of a label switching protocol traffic unit in a communications system comprising a plurality of label switching protocol communications network operational domains, the method comprising:

receiving said label switching protocol traffic unit at an edge node of a first label switching protocol communications network operational domain of said communications system, wherein at said edge node, said header stack comprises one or more label fields having values assigned by one or more nodes belonging to said first label switching protocol communications network operational domain;

processing the header stack at the edge node to add a new entry to said header stack, said new entry comprising a label field having a stack domain boundary value marking a boundary of a header stack domain comprising said one or more label fields configurable by a said one or more nodes belonging to said first label switching protocol communications network operational domain, and at a node belonging to another one of said plurality of label switching protocol communications network operational domains, adding one or more subsequent header fields and values added to said header stack to form a stack domain for said another one of said plurality of label switching protocol communications network operational domains; whereby in said another one other one of said plurality of label switching protocol communication network operational domains, said header stack comprises a plurality of stack domains, each respective stack domain comprising at least one label field to which a label value is assignable to enable one or more label switching nodes to operate on said traffic unit in a respective one of said plurality of label switching protocol communications network operational domains of said communications system.

* * * * *